(12) United States Patent
Bone et al.

(10) Patent No.: US 9,274,311 B2
(45) Date of Patent: Mar. 1, 2016

(54) COMPACT NARROW FIELD OF VIEW LENSES FOR MOBILE DEVICES

(71) Applicant: Genius Electronic Optical Co., Ltd., Taichung (TW)

(72) Inventors: Matthew Bone, Fremont, CA (US); Melvin Francis, Denver, CO (US)

(73) Assignee: Genius Electronic Optical Co., Ltd., Taiwan (CN)

( * ) Notice: Subject to any disclaimer, the term of this patent is extended or adjusted under 35 U.S.C. 154(b) by 186 days.

(21) Appl. No.: 14/154,130

(22) Filed: Jan. 13, 2014

(65) Prior Publication Data

US 2015/0198784 A1 Jul. 16, 2015

(51) Int. Cl.
*G02B 3/02* (2006.01)
*G02B 13/00* (2006.01)

(52) U.S. Cl.
CPC ............ *G02B 13/004* (2013.01); *G02B 13/006* (2013.01); *G02B 13/0065* (2013.01)

(58) Field of Classification Search
CPC .......... G02B 13/18; G02B 3/04; G02B 13/04; G02B 9/60; G02B 9/34; G02B 13/0035
USPC .......................................... 359/708, 713–716
See application file for complete search history.

(56) References Cited

U.S. PATENT DOCUMENTS

| 7,463,426 B2 * | 12/2008 | Nishio ........................... 359/683 |
| 7,777,973 B2 * | 8/2010 | Jeong et al. .................... 359/775 |
| 2010/0149659 A1 * | 6/2010 | Chen et al. ..................... 359/715 |

* cited by examiner

*Primary Examiner* — James Greece
(74) *Attorney, Agent, or Firm* — Kilpatrick Townsend & Stockton LLP (57) ABSTRACT

A compact optical imaging lens can include a front lens group, a rear lens group, and a reflective element to redirect light passing through the system. The reflective element can be placed in front of the front lens group or between the front and rear lens group. In some cases, multiple reflective elements can be used. The use of reflective elements can reduce the depth of the imaging system, allowing for more compact designs.

18 Claims, 7 Drawing Sheets

COMPACT NARROW FIELD OF VIEW LENSES FOR MOBILE DEVICES

TECHNICAL FIELD

The present disclosure relates to optical imaging lenses, and more particularly to optical imaging lenses that have a narrow field of view and are compact enough to be used in mobile devices.

BACKGROUND

The ongoing need for camera modules for installation in mobile devices such as mobile phones, portable digital assistants (PDAs) is driving demand for miniaturization of optical lens systems. Narrow field of view lens systems are in general too large and costly to be suitable for applications in mobile devices.

SUMMARY

A compact optical imaging lens system can include a front lens group, a rear lens group, and a reflective element to redirect light passing through the system. The reflective element can be placed in front of the front lens group or between the front and rear lens groups. In some cases, multiple reflective elements can be used. The use of reflective elements can reduce the depth of the imaging system, allowing for more compact designs.

Some embodiments of the present invention provide an optical imaging system having four lens elements arranged in series. The optical imaging lens includes, in order from an object side of the optical imaging lens to an image plane, a reflective member for folding a first optical axis of incident light toward a second optical axis perpendicular to the first optical axis, an aperture stop, a first lens element having an even-aspheric surface on the object side and on the image side, a second a first lens element having an even-aspheric surface on the object side and on the image side, a third lens element having an even-aspheric surface on the object side and on the image side, and a fourth lens element having an even-aspheric surface on the object side and on the image side. The aperture stop, the first, second, third, and fourth lens elements may be disposed along the second optical axis.

In another embodiment, an optical imaging lens having a relatively wide field of view includes a front lens group comprising a first lens element and a second lens element aligned along a first optical axis, a reflective member having a planar surface for reflecting light passing through the front lens group, and a rear lens group comprising a third lens element and a fourth lens element aligned along a second optical axis. The reflected light is disposed in a direction of the second optical axis, and the first and second optical axes intersect at an intersection point and form an angle. In an embodiment, the angle is in a range between 75 degrees and 90 degrees. In a preferred embodiment, the angle is 90 degrees. The field of view angle is between 30° and 40°.

In yet another embodiment, an optical lens system includes a front lens group having a first lens element and a second lens element arranged along a first optical axis, a first reflective member having a planar surface for reflecting light passing through the front lens group and disposed at a first distance from the front lens group, a second reflective member having a planar surface and disposed at a second distance from the first reflective member, and a rear lens group having a third lens element and a fourth lens element arranged along a third optical axis and disposed at a third distance from the second reflective member. The first and third optical axes are substantially parallel, and the second optical axis is perpendicular to the first and third optical axes.

In some embodiments, the first lens element has a positive refracting power, the second lens element has a negative refracting power, the third lens has a negative refracting power, and the fourth lens has a positive refracting power. The first through fourth lens elements have aspheric object-side and image-side surfaces.

In yet another embodiment, a compact optical lens system includes a front lens group having a first lens element and a second lens element arranged along a first optical axis and a first reflective member having a planar surface for redirecting light passing through the front lens group along the first optical axis to a direction of a second optical axis, the first reflective member is disposed at a first distance from the front lens group. The lens system further includes a second reflective member having a planar surface for redirecting light passing along the second optical axis to a direction of a third optical axis, the second reflective member disposed at a second distance from the first reflective member, and a rear lens group having a third lens element and a fourth lens element arranged along the third optical axis and disposed at a third distance from the second reflective member. The first and third optical axes are substantially parallel, and the second optical axis is perpendicular to the first and third optical axes.

The third optical axis may be in an opposite direction from the first optical axis or the third optical axis may be in the same direction of the first optical axis.

The following detailed description together with the accompanying drawings will provide a better understanding of the nature and advantages of the present invention.

DETAILED DESCRIPTION

It should be understood that the drawings are not drawn to scale, and similar reference numbers are used for representing similar elements. Various embodiments are described herein by way of example, and features described with respect to different embodiments may be combined and interchanged, without departing from the scope or spirit of the present invention.

Figure 1:
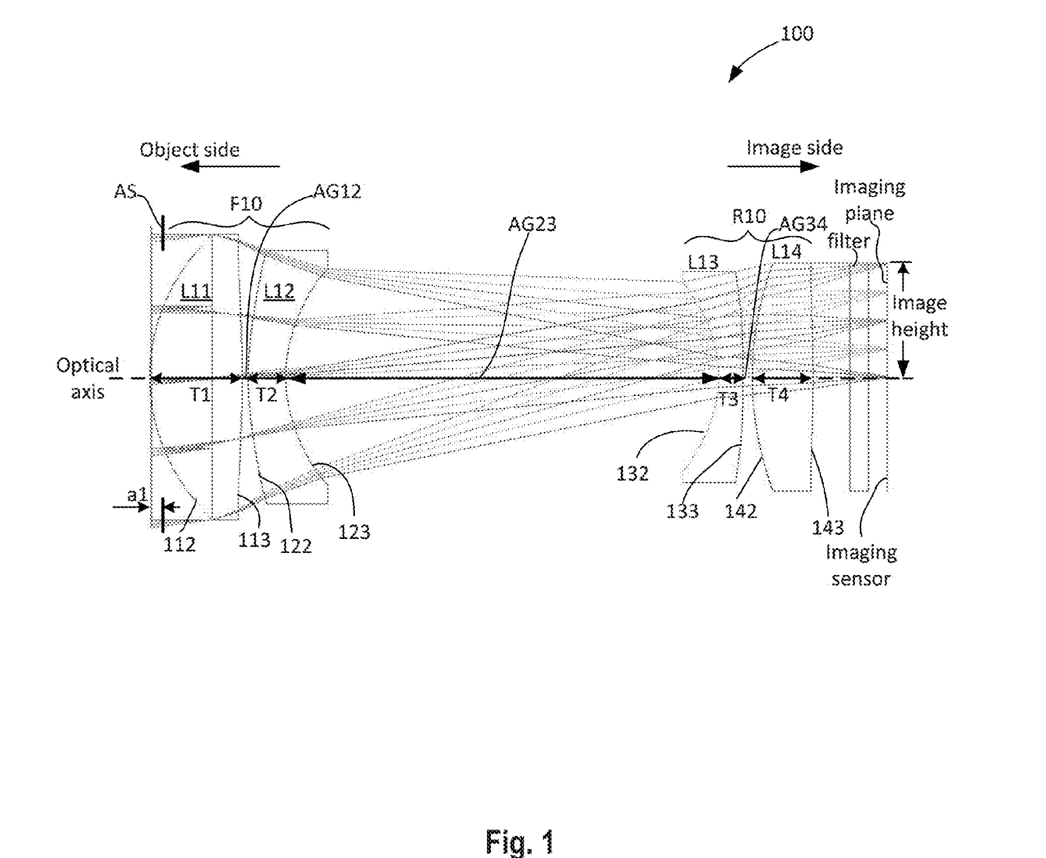
FIG. 1 is a simplified cross-sectional view of an imaging lens according to a first embodiment of the present invention.

In the present specification, "a lens element having a positive refracting power (or negative refracting power)" refers to the refracting power in the vicinity of the optical axis of the lens element having a positive refracting power (or negative refracting power). A surface is said to have a convex (or concave) portion in a specific region if the surface of the lens element protrudes outwardly (or depresses inwardly) along the direction parallel to the optical axis at the specific region, compared with a region radically adjacent to the specific region.

of the first, second, third and fourth lens elements are even-aspheric surfaces. Front lens group F10 has a positive refracting power and rear lens group R10 has a negative refracting power. The imaging lens system 100 has a maximum air gap between the front lens group F10 and the rear lens group R10.

The four lens elements can be made of different materials. In some embodiments, the four lens elements L11, L12, L13, and L14 are made of transparent plastic.

T1 is the thickness of first lens element L11, T2 is the thickness of second lens element L12, T3 is the thickness of third lens element L13, and T4 is the thickness of fourth lens element L14. Thicknesses T1-T4 are each measured along the optical axis.

AG12 is the air gap between the first and second lens elements, AG23 is the air gap between the second and third lens elements, and AG34 is the air gap between the third and fourth lens elements. AG12, AG23, and AG34 are each measured along the optical axis.

Table 1 shows numeric lens data of the lens elements L11, L12, L13, L14 of imaging lens 100 according to the first embodiment of the present invention. Surfaces are identified by lens number and either "o" for object side or "i" for image-side. "Thickness/air gap" represents thickness in the rows corresponding to object-side surfaces and air gap in the rows corresponding to image-side surfaces

TABLE 1

| Surface | Curvature (mm) | Radius (mm) | Thickness/ air gap (mm) | Refractive Index | Dispersion (Abbe number) | Focal Length (mm) | Semi- Diameter (mm) |
| --- | --- | --- | --- | --- | --- | --- | --- |
| Aperture stop | 0 | Infinity | −1.019 | | | | 2.5 |
| LENS 1 o | 0.2825 | 3.5394 | 1.5 | 1.544 | 56.11 | 5.807 | 2.4997 |
| LENS 1 i | −0.0386 | −25.8448 | 0.1 | | | | 2.4024 |
| LENS 2 o | 0.1711 | 5.8414 | 0.61 | 1.639 | 23.52 | −8.053 | 2.2248 |
| LENS 2 i | 0.3793 | 2.6359 | 7.0492 | | | | 1.8991 |
| LENS 3 o | −0.4029 | −2.4817 | 0.4 | 1.544 | 56.11 | −4.971 | 1.6679 |
| LENS 3 i | −0.0326 | −30.6394 | 0.15 | | | | 1.8473 |
| LENS 4 o | 0.1684 | 5.9354 | 0.9908 | 1.639 | 23.52 | 6.975 | 2.0010 |
| LENS 4 i | −0.0577 | −17.3270 | 0.6 | | | | 2.0042 |

First Embodiment

FIG. 1 is a simplified cross-sectional view of an imaging lens system 100 according to a first embodiment of the present invention. Imaging lens system 100 includes an aperture stop AS, a front lens group F10, and a rear lens group R10 in this order from the object side to the image side. Imaging lens system 100 can also include an IR filter disposed between the rear lens group and an imaging sensor disposed in the imaging plane.

Front lens group F10 includes a first lens element L11 which has a convex surface 112 on the object side and a convex surface 113 on the image side, and a second lens element L12 which is a negative meniscus lens having a convex object side surface 122 and a concave image side surface 123. Rear lens group R10 includes a third lens element L13 which has a concave object-side surface 132 and a convex image-side surface 133 and a fourth lens element L14 which has a convex object-side surface 142 and a convex image-side surface 143. The object- and image-side surfaces According to the first embodiment, the aperture stop is located at the object-side surface of LENS 1 as shown in FIG. 1 and the semi-diameter is about 2.5 mm. The abbe number of LENS1 (i.e., first lens element) is greater than 40. In this embodiment, the abbe number of LENS1 is 56.11. The distance a1 between the apex of the object-side surface 112 and the aperture stop along the optical axis is 1.019 mm. In some embodiments, the airgap AG12 between the image side surface 113 of the first lens element L11 and the object side surface 122 of the second lens element L12 is about 0.1 mm along the optical axis. The airgap AG23 between the image side surface 123 of the second lens element L12 and the object side surface of the third lens element L13 along the optical axis is about 7.05 mm. In this embodiment, the field of view angle is relative large and is between 30° and 40°. The image height is about 2.00 mm. The effective focal length (EFL), also known as focal length, is about 13.998 mm. The focal length of an optical imaging system is defined as the distance over which collimated rays are brought to a focus.

In this embodiment, the total track length (TTL) measured from the object side surface of first lens element L11 to the imaging plane along the optical axis is about 12.36 mm, preferably in the range between 5 mm to 20 mm, and more preferably between 8 mm to 14 mm. The ratio TTL/EFL can be equal to or less than 0.9, and preferably in the range between 0.2-0.9. In this embodiment, the TTL/EFL value is 0.883. The ratio TTL/(the semi-diameter of the aperture stop) can be equal to or less than 8.0, and preferably in the range between 2.0-8.0. In this embodiment, this ratio value is 4.944.

The term "MaxAG" denotes a maximum air gap width between adjacent lens elements. In this embodiment, the maximum air gap is the gap between the second lens element and the third lens element. The ratio of ALT/MaxAG is within a range between 0.3 and 0.7, preferably between 0.4 and 0.6. The term "ALT" is the sum of thicknesses of the first to fourth lens elements along the optical axis. Taking into account the ray path, the air gap between second lens element L12 and third lens element L13 should be sufficiently large for the light that passes through front lens group F10 to fully enter the relatively small diameter of third lens L13.

The even-aspheric surface of a lens element can be described using the following expression:

$$z = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16}. \quad (1)$$

where z is the depth of the aspheric surface, c is the curvature of the lens surface, r is the distance (height) in millimeters (mm) from the optical axis to the lens surface, k is a conic constant, and $\alpha(i)$ is i-th degree (or order term) aspheric surface coefficients.

Table 2 shows numeric values of the conic constant k and aspheric surface coefficients for each of the aspheric lens elements of the first embodiment.

TABLE 2

| Surface | Conic const. k | ASPHERIC COEFFICIENTS | | | |
|---|---|---|---|---|---|
| | | $\alpha_1$ | $\alpha_2$ | $\alpha_3$ | $\alpha_4$ |
| LENS 1 o | 0 | 0 | 7.79E−05 | −6.27E−05 | −9.66E−07 |
| LENS 1 i | 0 | 0 | 8.89E−04 | 1.57E−04 | −1.12E−05 |
| LENS 2 o | 0 | 0 | −1.23E−02 | 1.91E−03 | −1.15E−04 |

TABLE 2-continued

| Surface | Conic const. k | ASPHERIC COEFFICIENTS | | | |
|---|---|---|---|---|---|
| | | $\alpha_1$ | $\alpha_2$ | $\alpha_3$ | $\alpha_4$ |
| LENS 2 i | 0 | 0 | −1.57E−02 | 2.13E−03 | −1.12E−04 |
| LENS 3 o | 0 | 0 | 2.95E−03 | 1.23E−03 | 2.52E−04 |
| LENS 3 i | 0 | 0 | −1.09E−02 | 1.34E−03 | 4.53E−05 |
| LENS 4 o | 0 | 0 | −6.24E−04 | 4.28E−06 | 0.00E+3000 |
| LENS 4 i | 0 | 0 | 8.89E−03 | −1.00E−03 | 0.00E+3000 |

All higher degree aspheric coefficients can be zero.

Second Embodiment

Figure 2A:
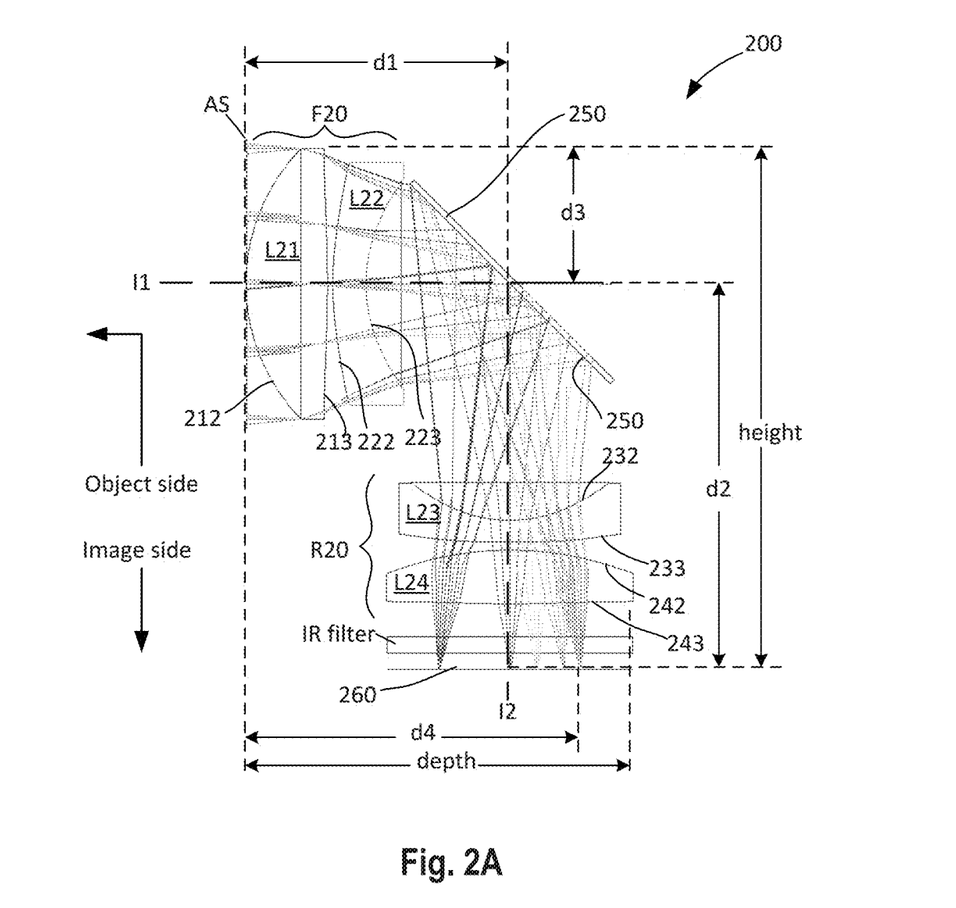
FIG. 2A is a simplified cross-sectional view of an imaging lens according to a second embodiment of the present invention.

The imaging lens 100 described in the first embodiment can be modified to include a reflective member having a planar reflective surface to reflect light passing through front lens group F10. FIG. 2 is a simplified cross-sectional view of an imaging lens 200 according to a second embodiment of the present invention. Imaging lens 200 includes, from the object side to the image side, a front lens group F20 arranged along a first optical axis I1, a reflective member 250 having a planar reflective surface for changing a direction of a light path, and a rear lens group R20 arranged in a second optical axis I2. In the second embodiment, the second optical axis I2 intersects the first optical axis I1 at a 90-degrees angle.

In some embodiments, front lens group F20 includes a first biconvex lens element L21 having a convex object-side surface 212 and a convex image-side surface 213, and a second lens element L22 having a convex object-side surface 222 and a concave image-side surface 223. Rear lens group R20 includes a third lens element L23 having a concave object-side surface 232 and a convex image-side surface 233, and a fourth lens element L24 having a convex object-side surface 242 and a convex image-side surface 243. The object-side and image-side surfaces of the first, second, third, and fourth lens elements are even-aspheric surfaces. Image lens 200 also includes an optical aperture stop AS disposed at the object side of first lens element L21. Reflective member 250 can be, for example, a planar mirror or a prism.

The lens elements can be made of different materials. In some embodiments, the four lens elements L21, L22, L23, and L24 are made of transparent plastic.

Table 3 shows numeric lens data of the lenses of imaging lens 200 according to an embodiment of the present invention.

TABLE 3

| element | surface | Curvature (1/mm) | Radius (mm) | Thickness/ air gap (mm) | Refractive Index | Dispersion | Material | Focal Length (mm) |
|---|---|---|---|---|---|---|---|---|
| LENS 1 | 212 | 2.83E−01 | 3.5394 | 1.5 | 1.544 | 56.11 | plastic | 5.81 |
| | 213 | −3.87E−02 | −25.8448 | 0.1 | | | | |
| LENS 2 | 222 | 1.71E−01 | 5.8414 | 0.61 | 1.639 | 23.52 | plastic | −8.05 |
| | 223 | 3.79E−01 | 2.6359 | 2.00 | | | | |
| fold mirror | | 0.00 | | −4.395 | mirror | | | |
| LENS 3 | 232 | 4.03E−01 | 2.4817 | −0.4 | 1.544 | 56.11 | plastic | −4.97 |
| | 233 | 3.26E−02 | 30.6394 | −0.15 | | | | |
| LENS 4 | 242 | −1.68E−01 | −5.9354 | −0.991 | 1.639 | 23.52 | plastic | 6.98E+00 |
| | 243 | 5.77E−02 | 17.3270 | −0.6 | | | | |
| filter | | 0.00 | | −0.3 | BK7 | | | |
| | | 0.00 | | −0.314 | | | | |

In this embodiment, a distance d1 measured from object-side surface 212 of first lens element L21 to the center of reflective member 250 along first optical axis I1 is 4.21 mm. A distance d2 measured from the center of reflective member 250 to the imaging plane is about 7.15 mm. And TTL denotes the sum of the two values d1 and d2 (4.21+7.15). A distance d3 measured from an outermost edge of first lens element L21 to optical axis I1 is 1.32 mm. A depth measured from front (object-side) surface 212 to an outermost edge of imaging plane 260 is about 7.1 mm. A distance d4 measured from front surface 212 to an outermost edge of an active area of imaging plane is 6.15 mm. A height measured from an outermost edge of front lens group F20 to a planar surface of imaging plane 260 is the sum of d2 and d3 and is about 8.5 mm or less. In this embodiment, the total track length (TTL) is the distance measured from the object-side surface 212 of first lens element L21o to the imaging plane is about 12.36 mm. The ratio TTL/EFL is 0.883. The ratio TTL/(the semi-diameter of the aperture stop) is 4.944.

The air gap between adjacent lens elements which that are disposed closest to the image plane can be equal to or less than 0.5 mm, and preferably in the range of 0.05-0.5 mm. In this embodiment, the air gap nearest the image plane is the air gap between the third and the fourth lens element AG34, and has a width of 0.15 mm.

Table 4 shows numeric values of the conic constant k and aspheric surface coefficients for each of the aspheric lens elements of the second embodiment.

TABLE 4

| element | surface | Semi-Diameter (mm) | Conic const. k | $\alpha_1$ | $\alpha_2$ | $\alpha_3$ | $\alpha_4$ |
|---|---|---|---|---|---|---|---|
| LENS 1 | 212 | 2.5 | 0 | 0 | 7.7895E−05 | −6.27441E−05 | −9.66225E−07 |
| | 213 | 2.402 | 0 | 0 | 0.00088922 | 0.000157028 | −1.11729E−05 |
| LENS 2 | 222 | 2.225 | 0 | 0 | −0.01234147 | 0.001907336 | −0.000114639 |
| | 223 | 1.899 | 0 | 0 | −0.01567571 | 0.00213352 | −0.000112039 |
| Fold mirror | | 2.472 | 0 | 0 | 0 | 0 | 0 |
| LENS 3 | 232 | 1.667 | 0 | 0 | −0.00295192 | −0.001227722 | −0.00025187 |
| | 233 | 1.847 | 0 | 0 | 0.01088246 | −0.001344787 | −4.52873E−05 |
| LENS 4 | 242 | 2.001 | 0 | 0 | 0.00062416 | −4.27951E−06 | 0 |
| | 243 | 2.004 | 0 | 0 | −0.00889237 | 0.001000947 | 0 |
| Image plane | | 1.995 | 0 | 0 | | 0 | 0 |

Lens 200 has a half field of view angle in a range between 10 degrees and 20 degrees, and preferably in the range between 17 degrees and 19 degrees. The F number is 2.8.

Figure 2B:
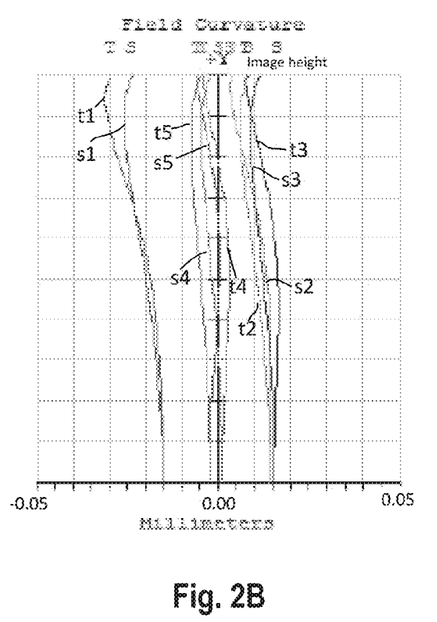
FIG. 2B shows aberrations characteristics according to the second embodiment of the present invention.

FIG. 2B shows the sagittal and tangential aberrations of a lens according to the second embodiment. The sagittal (denoted as s1, s2, s3, s4, s5) and tangential (denoted as t1, t2, t3, t4, t5) astigmatic aberration for the respective wavelengths 470 nm, 510 nm, 555 nm, 610 nm, and 650 nm. As shown, the astigmatic aberration is within ±0.04 mm.

Figure 2C:
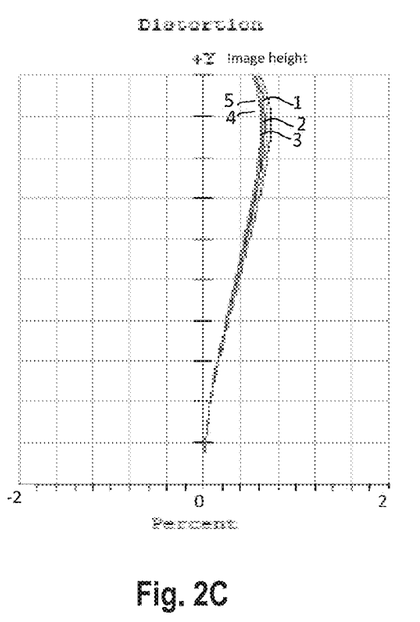
FIG. 2C shows distortion performance according to the second embodiment of the present invention.

FIG. 2C shows the distortion of a lens according to the second embodiment. The distortion for the respective wavelengths 470 nm, 510 nm, 555 nm, 610 nm, and 650 nm is shown as the respective curves denoted 1, 2, 3, 4, and 5.

Third Embodiment

Figure 3:
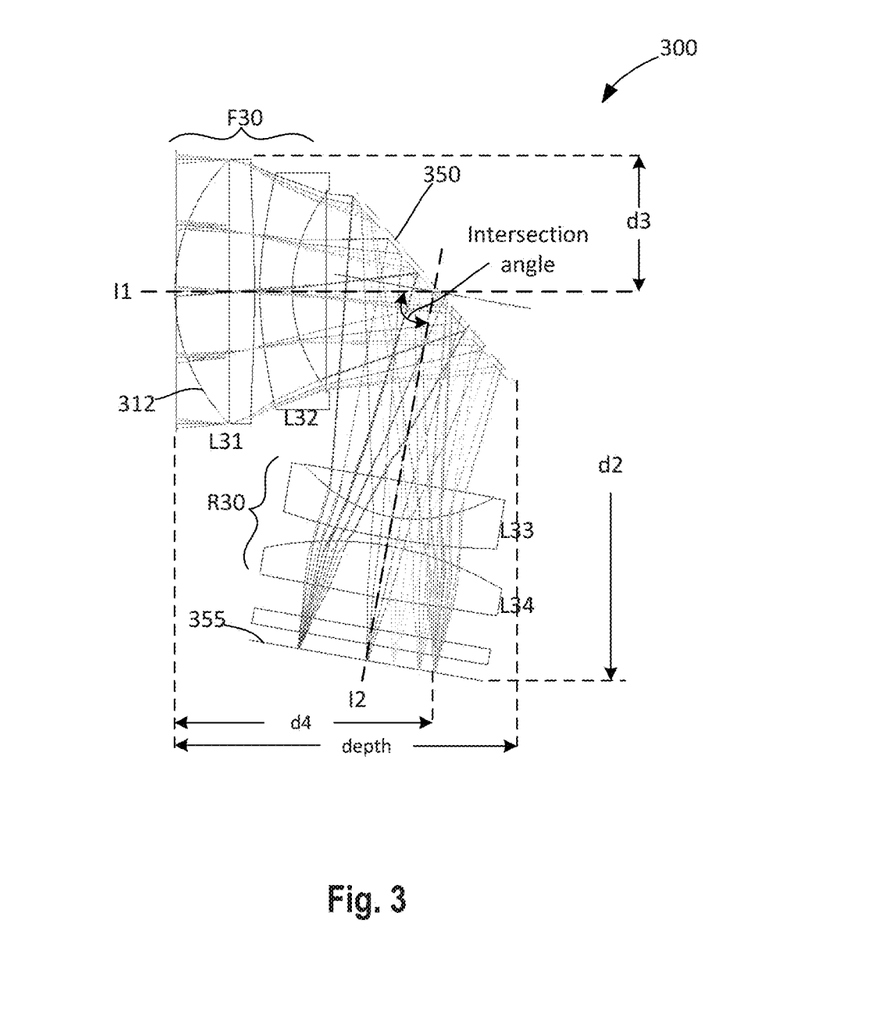
FIG. 3 is a simplified cross-sectional view of an imaging lens according to a third embodiment of the present invention.

FIG. 3 shows an optical imaging lens 300 according to a third embodiment of the present invention. In this embodiment, reflective member 350 is arranged such that second optical axis I2 intersects first optical axis I1 at an angle different from 90 degrees. It is desirable that the intersection angle satisfies the following condition:

75 degrees≤intersection angle≤90 degrees.

If the intersection angle is smaller than 75 degrees, the image plane has to be tilted to a considerable degree. This may adversely affect the optical characteristics and performance of imaging lens 300. If the angle is larger than 90 degrees, the lateral depth of lens 300 will increase.

The lens elements may be the same as or similar to those described above with reference to the second embodiment. Numeric data of imaging lens 300 may be the same as the numeric data of imaging lens 200 (see Tables 3 and 4). Lens elements L31, L32, L33, and L34 can be made of transparent plastic or other optical materials. In some embodiments, the lateral depth of imaging lens 300 is about 6.13 mm measured from the object side surface 312 of first lens element L31 along optical axis I1 to the outermost point of reflective member 350 or the rear lens group R30, whichever extends farther. A distance d2 measured from the intersection point of optical axes I1 and I2 to the outermost edge of imaging plane 355 along the direction orthogonal to first optical axis I1 is 7.30 mm. A distance d3 measured from the outermost edge of front lens group F30 to the intersection point of optical axes I1 and I2 corresponds to the semi-diameter of the first lens element L21 and is about 1.32 mm. A distance d4 measured from object-side surface 312 of first element L31 to an outermost edge of the active area of an imaging sensor placed on imaging plane 355 is 4.90 mm.

Fourth Embodiment

Figure 4:
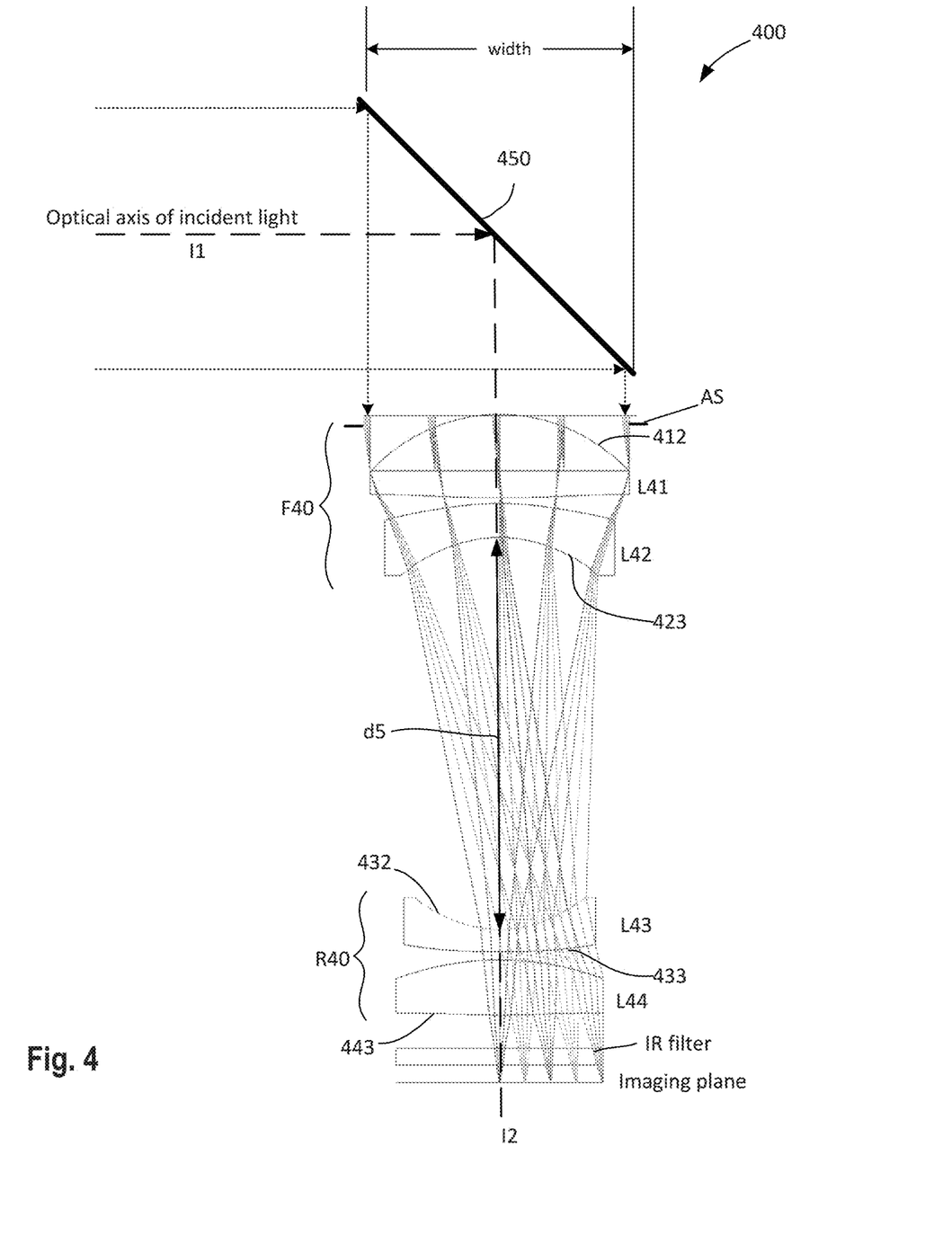
FIG. 4 is a simplified cross-sectional view of an imaging lens according to a fourth embodiment of the present invention.

FIG. 4 shows an optical imaging lens 400 according to a fourth embodiment of the present invention. In this embodiment, a reflective member 450 is disposed in the direction of a first optical axis I1 of incoming light in front of all lens elements. This folding structure can significantly reduce the lateral depth (also referred to as lateral width or thickness) to achieve a slim design of an optical imaging lens system. Reflective member 450 can be a mirror or a prism that folds the optical axis of incident light toward a direction perpendicular to the folded optical axis.

Imaging lens 400 includes, in order from the object side to the imaging plane, reflective member 450 to redirect the optical axis of incident light to a second optical axis I2, an aperture stop AS, a first lens group F40, and a second lens group R40. Aperture stop AS, first lens group F40 and second lens group R40 are aligned along second optical axis I2, which is perpendicular to optical axis I1 of incident light. First lens group F40 includes a first lens element L41 having positive refracting power and a second lens element L42 having a negative refracting power. Second lens group R40 includes a third lens element L43 having a negative refracting power and a fourth lens element L44 having a positive refracting power. Imaging lens 400 may include an IR filter disposed between the second lens group and an imaging plane, in which an imaging sensor can be placed.

In some embodiments, reflective member 450 may have a dimension equal to or greater than the dimension of aperture stop AS. Reflective member 450, aperture stop AS, first lens group F40 and second lens group R40 can be held at a fixed distance from each other. Reflective member 450 can be arranged at 45 degrees relative to optical axis I1 of incident light. The distance d5 between first lens group F40 and second lens group R40 measured from image side surface 423 of the second lens element L42 to object side surface 432 of the third lens element L43 along second optical axis I2 is about 7.0 mm.

Numeric data of the lens elements of imaging lens 400 may be the same as the numeric data of imaging lens 100 (see Tables 1 and 2). First lens group F40 can have a thickness measured from the apex of object-side surface 412 of first lens element L41 to image side surface 423 of second lens element L42 of about 2.21 mm. The thickness of second lens group R40 measured from object-side surface 432 of third lens element L43 to image-side surface 443 of fourth lens element L44 along second optical axis can be about 1.55 mm. The IR filter can have a thickness of 0.3 mm and can be disposed at a distance of 0.314 mm from the imaging plane.

In some embodiments, aperture stop AS has a diameter of 5.0 mm, and reflective member 450 has a diameter of 5.2 mm. Because reflective member 450 is arranged at an angle of 45 degrees, the lateral width or thickness of the imaging lens 400 is about 5.2 mm×0.71=3.7 mm. The half field of view is in a range between 10 degrees and 20 degrees, preferably about 18 degrees. The F number is 2.8.

Fifth Embodiment

Figure 5:
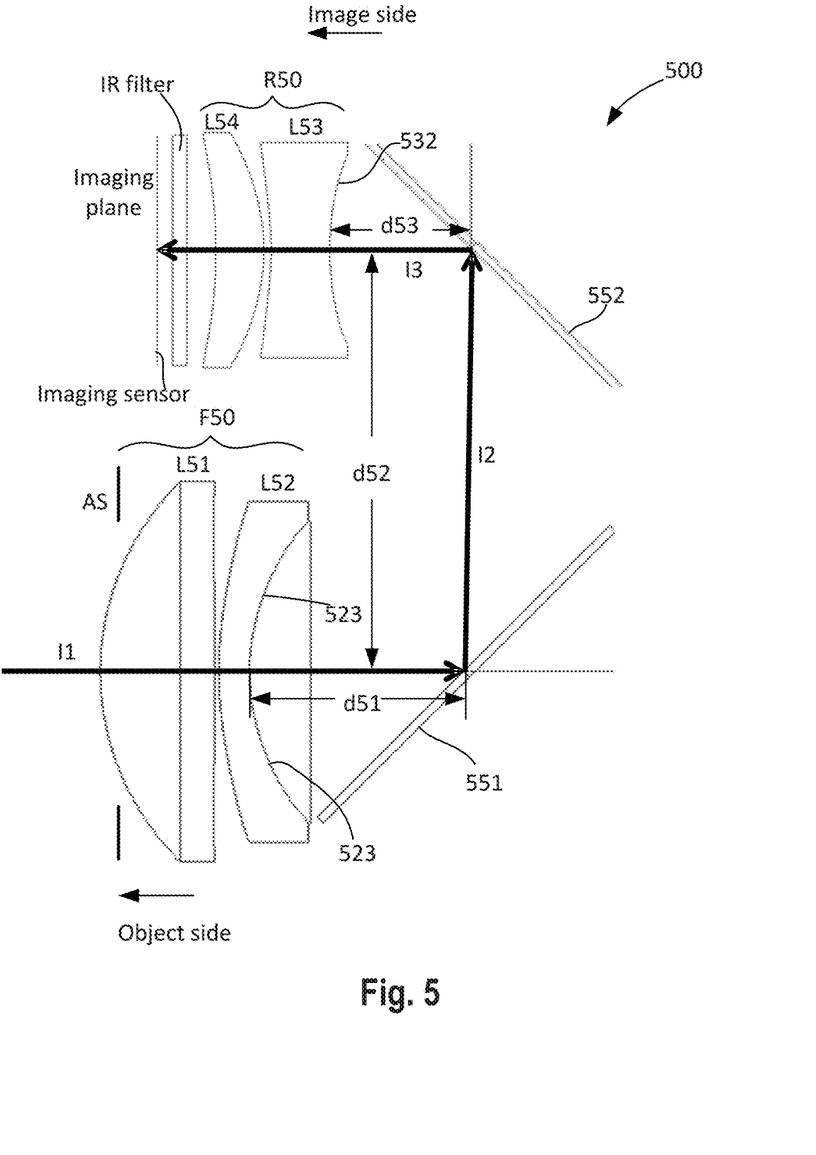
FIG. 5 is a simplified cross-sectional view of an imaging lens according to a fifth embodiment of the present invention.

FIG. 5 shows an optical imaging lens 500 according to a fifth embodiment of the present invention. In this embodiment, a first reflective member 551 is disposed in the direction of first optical axis I1 of incident light at a distance d51 from a second lens element L52 of a front lens group F50 to direct the incident light toward a second reflective member 552. Second reflective member 552 is disposed at a distance d52 from first reflective member 551 and directs the folded incident light toward a rear lens group R50. This two-reflector folding structure can significantly reduce the height to enable a compact design of an optical imaging lens system. First reflective member 551 can be a mirror or a prism that redirects the optical axis of incident light toward a direction perpendicular to the optical axis of incoming light. Second reflective member 552 can be a mirror or a prism that redirects incident light of second axis I2 toward an opposite direction substantially parallel to first optical axis I1 of incoming light.

Imaging lens 500 includes, in order from the object side to the imaging plane, an aperture stop AS, a first lens group F50, first reflective member 551, second reflective member 552, and a second lens group R50. Aperture stop AS and first lens group F50 are aligned along first optical axis I1. First reflective member 551 is disposed at the distance d51 from image-side surface 523 of lens element L52. Second reflective member 552 is disposed at a distance d53 from object-side surface 532 of lens element L53. Second lens group R50 is aligned along a third optical axis I3 that is substantially parallel to first optical axis I1 and perpendicular to second optical axis I2. First lens group F50 includes a first lens element L51 having a positive refracting power and a second lens element L52 having a negative refracting power. Second lens group R50 includes a third lens element L53 having a negative refracting power and a fourth lens element L54 having a positive refracting power. Imaging lens 500 may include an IR filter disposed between second lens group R50 and an imaging plane in which an imaging sensor can be placed.

In some embodiments, the sum of the distance d51, d52, and d53 is equal to the air gap AG23 of FIG. 1, i.e., d51+d52+d53=AG23. Lens elements L51, L52, L53, and L54 can be similar or identical to lens elements L11, L12, L13, and L14 of FIG. 1. Numeric data of imaging lens 500 may be the same as the numeric data of imaging lens 100 (see Tables 1 and 2). The compact size of the fifth embodiment is convenient for designs in mobile phones.

In some embodiments, first and second reflective members 551, 552 are arranged substantially at a right angle (90 degrees) to each other. Accordingly, front lens group F50 and rear lens group R50 can be disposed on the same side of reflective members 551, 552, as shown in FIG. 5. In other words, the object side and the image side face the same direction, i.e., third optical axis I3 is in an opposite direction from first optical axis I1.

Sixth Embodiment

Figure 6:
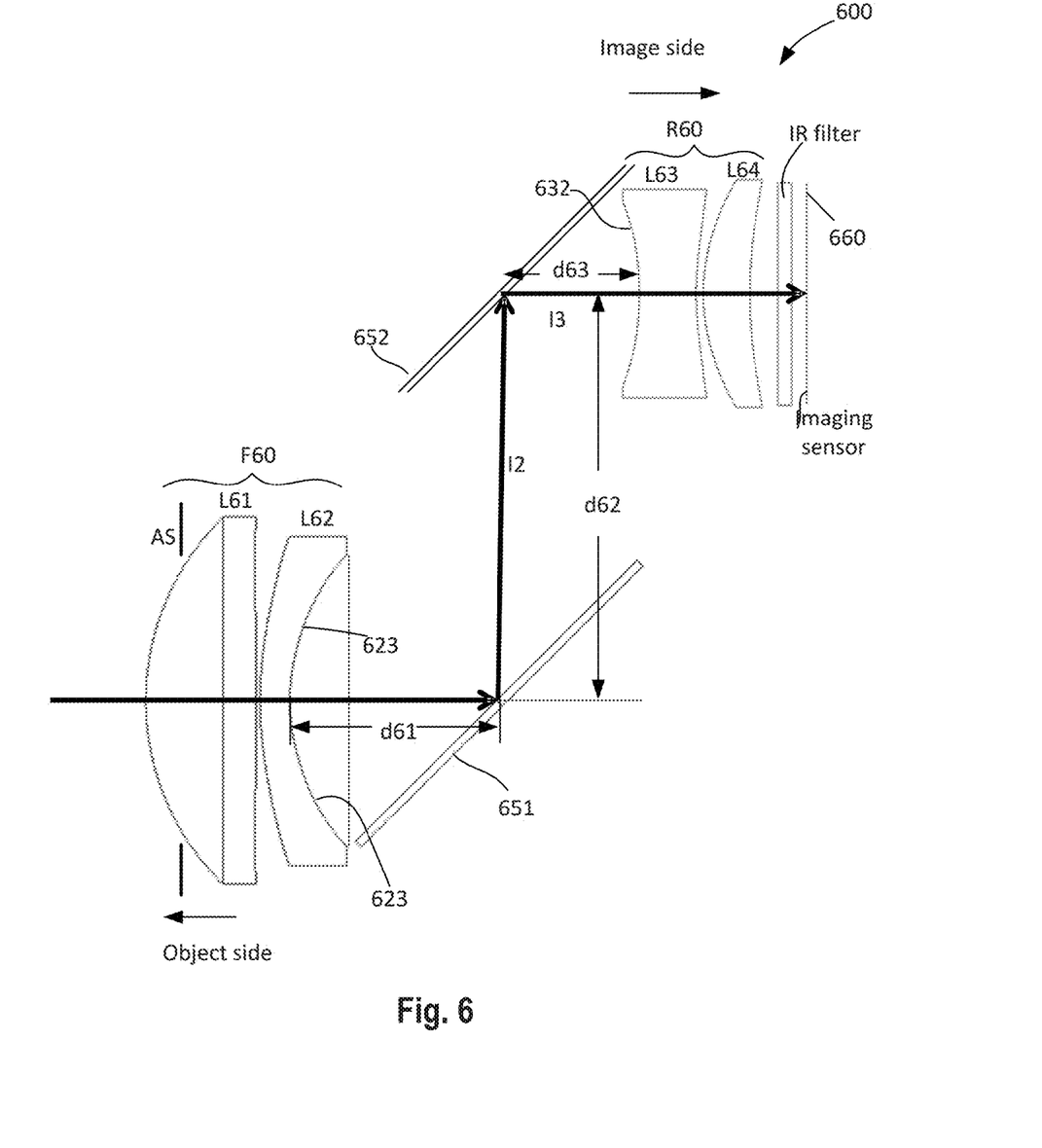
FIG. 6 is a simplified cross-sectional view of an imaging lens according to a sixth embodiment of the present invention.

FIG. 6 shows an optical imaging lens 600 according to a sixth embodiment of the present invention. In this embodiment, a first reflective member 651 having a planar surface is disposed in the direction of first optical axis I1 of incident light at a distance d61 from imaging side 623 of second lens element L62 of a front lens group F60 for directing the incident light passing through front lens group F60 to second reflective member 652. Second reflective member 652 is disposed at a distance d62 from first optical axis I1 and redirects the folded incident light toward a rear lens group R60. This two-reflector folding structure can significantly reduce the height to enable a compact design of an optical imaging lens system. First reflective member 651 can be a mirror or a prism that redirects the optical axis of incident light toward a direction perpendicular to the optical axis of incoming light. Second reflective member 652 can be a mirror or a prism that redirects incident light of second axis I2 toward a third optical axis that can be substantially parallel to first optical axis I1 of incoming light.

Aperture stop AS and first lens group F60 are aligned along first optical axis I1. Second reflective member 652 is disposed at a distance d63 from object-side surface 632 of lens element L53. Second lens group R60 is aligned along a third optical axis I3 that is substantially parallel to first optical axis I1 and perpendicular to second optical axis I2. First lens group F60 includes a first lens element L61 having a positive refracting power and a second lens element L62 having a negative refracting power. Second lens group R60 includes a third lens element L63 having a negative refracting power and a fourth lens element L64 having a positive refracting power. Imaging lens 600 may include an IR filter disposed between second lens group R60 and an imaging plane in which an imaging sensor can be placed. In this embodiment, first and second reflective members are arranged substantially parallel to each other, and front lens group F60 and rear lens group R60 are arranged on different sides of reflective members 651, 652, as shown in FIG. 6. In other words, first and third optical axes I1 and I3 are in the same direction facing toward imaging plane 660.

In some embodiments, the sum of the distance d61, d62, and d63 is equal to the air gap AG23 of FIG. 1, i.e., d61+d62+d63=AG23. Lens elements L61, L62, L63, and L64 can be similar or identical to lens elements L11, L12, L13, and L14 of FIG. 1. Numeric data of imaging lens 600 may be the same as the numeric data of imaging lens 100 (see Tables 1 and 2). The compact size of the sixth embodiment is convenient for designs in mobile phones.

While the invention has been described with respect to specific embodiments, one of skilled in the art will recognize that numeric modifications are possible. Thus, it will be appreciated that the invention is intended to cover all modifications and equivalents within the scope of the appended claims.

What is claimed is:

1. A compact optical imaging lens comprising, in order from an object side of the optical imaging lens to an image plane:
   an aperture stop;
   a front lens group comprising at least one lens element having a positive refractive power aligned along a first optical axis;
   a first reflective member having a reflective surface arranged at an angle in relation to the first optical axis and operable to fold incident light along the first optical axis toward a second optical axis;
   a rear lens group comprising at least one lens element having a negative refractive power aligned along the second optical axis;
   a ratio of the total track length (TTL) to a semi-diameter of the aperture stop is equal to or less than 8; and
   wherein an effective focal length is defined as EFL, and it satisfies the relation:

TTL/EFL≤0.9.

2. The compact optical imaging lens of claim 1, wherein the angle is 45 degrees.

3. The compact optical imaging lens of claim 1, wherein a sum of thicknesses of all lens elements along the first or second optical axes is defined as ALT and an maximum air gap between two adjacent lens elements is defined as MaxAG, wherein ALT and MaxAG satisfy the relation:

0.35<ALT/MaxAG<0.7.

4. The compact optical imaging lens of claim 1, wherein TTL is in a range between 5 mm and 20 mm.

5. The compact optical imaging lens of claim 1, wherein an air gap between two adjacent lens elements disposed closest to the image plane is less than or equal to 0.5 mm.

6. The compact optical imaging lens of claim 1, further comprising a second reflective member disposed between the front lens group and the rear lens group and configured to redirect the folded incident light along the second optical axis.

7. The compact optical imaging lens of claim 1, wherein the angle is in a range between 75 degrees and 90 degrees.

8. The compact optical imaging lens of claim 1, wherein the abbe number of the first lens element is greater than 40.

9. The compact optical imaging lens of claim 1, wherein an intersection point of the first and second optical axes is at a distance in a range between 6.9 mm and 7.2 mm from an imaging plane.

10. A compact optical imaging lens having a field of view, the compact optical imaging lens comprising:
    a front lens group comprising at least one lens element having a positive refractive power; and
    a rear lens group comprising at least one lens element having a negative refractive power,
    wherein the field of view of the compact optical imaging lens is less than 40°,
    wherein a ratio of the total track length (TTL) to a semi-diameter of an aperture stop is equal to or less than 8; and
    wherein an effective focal length is defined as EFL, and it satisfies the relation:

TTL/EFL≤0.9.

11. The compact optical imaging lens of claim 10, wherein the field of view is in a range between 30° and 40°.

12. The compact optical imaging lens of claim 10, further comprising:
    an imaging plane of an imaging sensor, wherein the imaging plane is orthogonal to the aperture stop, and the aperture stop is disposed in front of the front lens group toward a direction of an object side.

13. The compact optical imaging lens of claim 10, wherein a depth measured from an object-side surface of the first lens element to an outermost edge of the imaging sensor is about 7.1 mm.

14. The compact optical imaging lens of claim 10, wherein:
    the front lens group comprises a first lens element and a second lens element;
    the rear lens group comprises a third lens element and a fourth lens element;
    the first lens element has a positive refracting power;
    the second lens element has a negative refracting power;
    the third lens element has a negative refracting power;
    the fourth lens element has a positive refracting power; and
    the first, second, third, and fourth lens elements have aspheric object-side and image-side surfaces.

15. A compact optical imaging lens comprising:
    a front lens group comprising at least one lens element having a positive refractive power;
    a rear lens group comprising at least one lens element having a negative refractive power; and
    a ratio between a total track length (TTL) and an effective focal length (EFL) is less than or equal to 0.9,
    wherein a ratio of the total track length to a semi-diameter of the aperture stop is equal to or less than 8.

16. The compact optical imaging lens of claim 15, further comprising:
    an aperture stop disposed in front of the front lens group toward a direction of an object side, wherein the aperture stop is parallel to an active area of an imaging sensor.

17. The compact optical imaging lens of claim 6, wherein the incident light along the first optical axis and a redirected light beam along the second optical axis are parallel to each other and point in opposite directions.

18. The compact optical imaging lens of claim 6, wherein the incident light along the first optical axis and a redirected light beam along the second optical axis are parallel to each other and point in a same direction.

* * * * *